Nov. 13, 1928.
D. E. LEWELLEN
1,691,294
AUTOMATIC SPEED CONTROLLING DEVICE
Filed Aug. 7, 1922          6 Sheets-Sheet 1
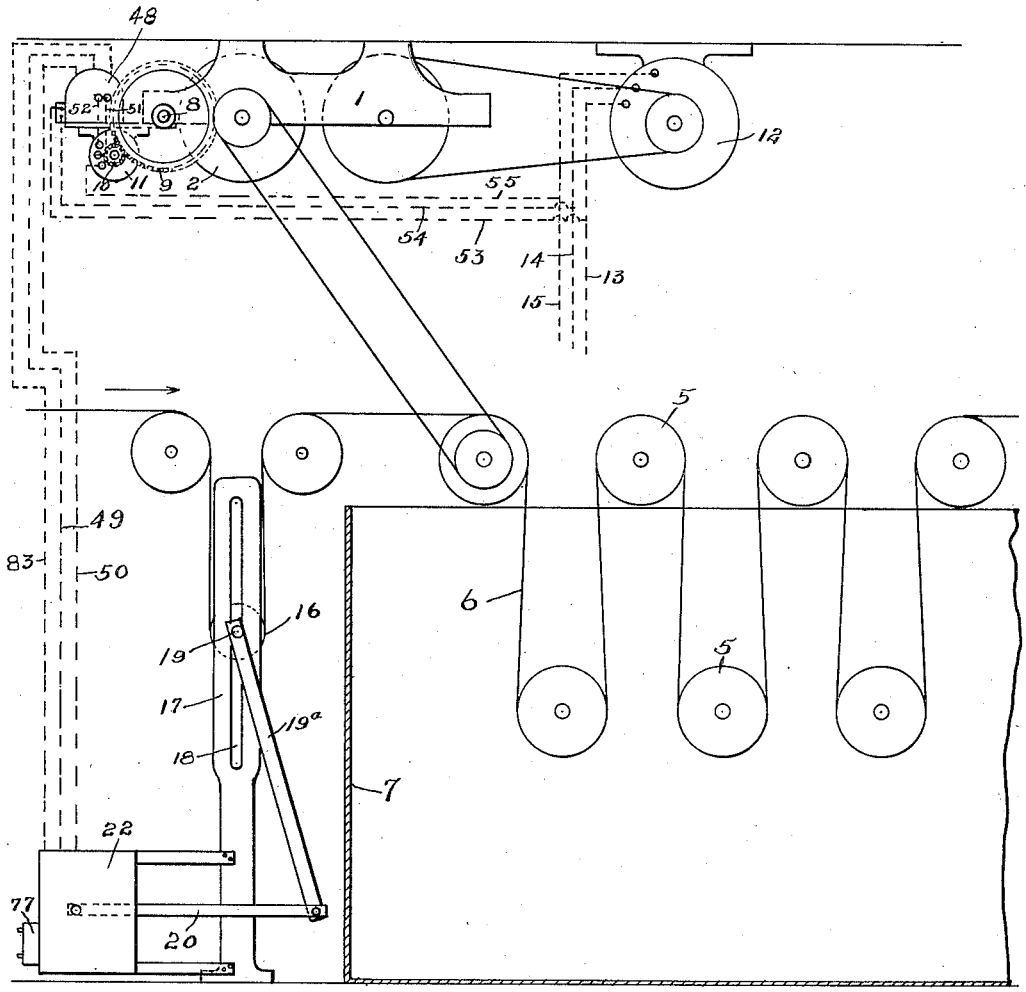
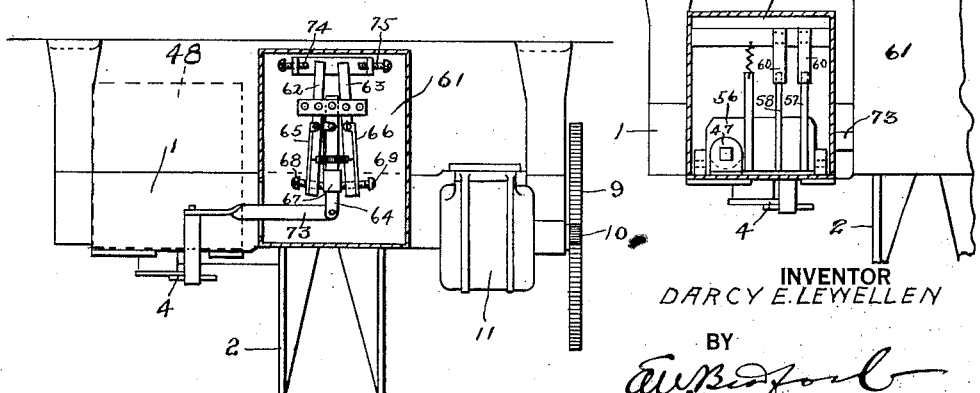
INVENTOR
DARCY E. LEWELLEN
BY
ATTORNEY

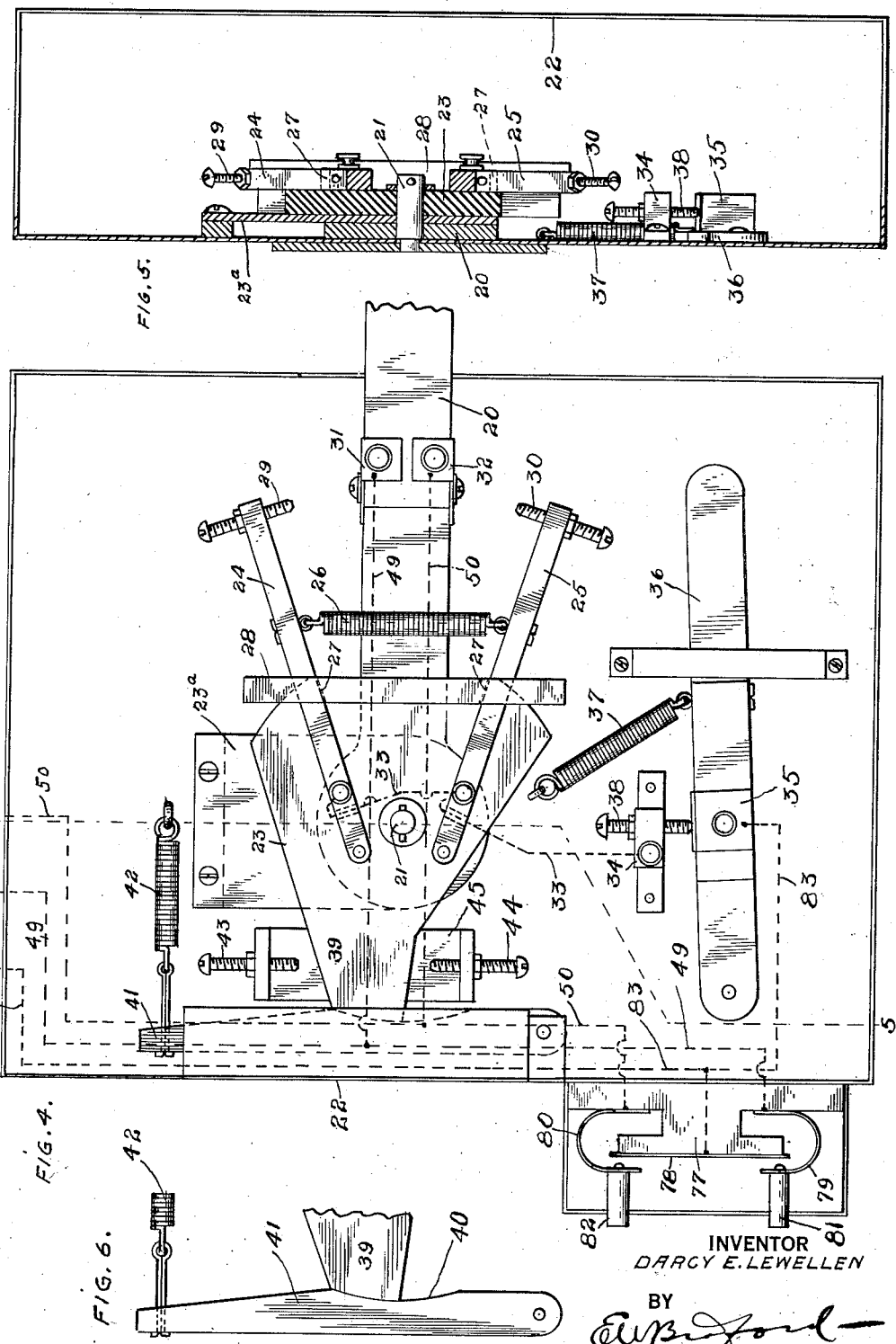

Nov. 13, 1928.
D. E. LEWELLEN
1,691,294
AUTOMATIC SPEED CONTROLLING DEVICE
Filed Aug. 7, 1922  6 Sheets-Sheet 3
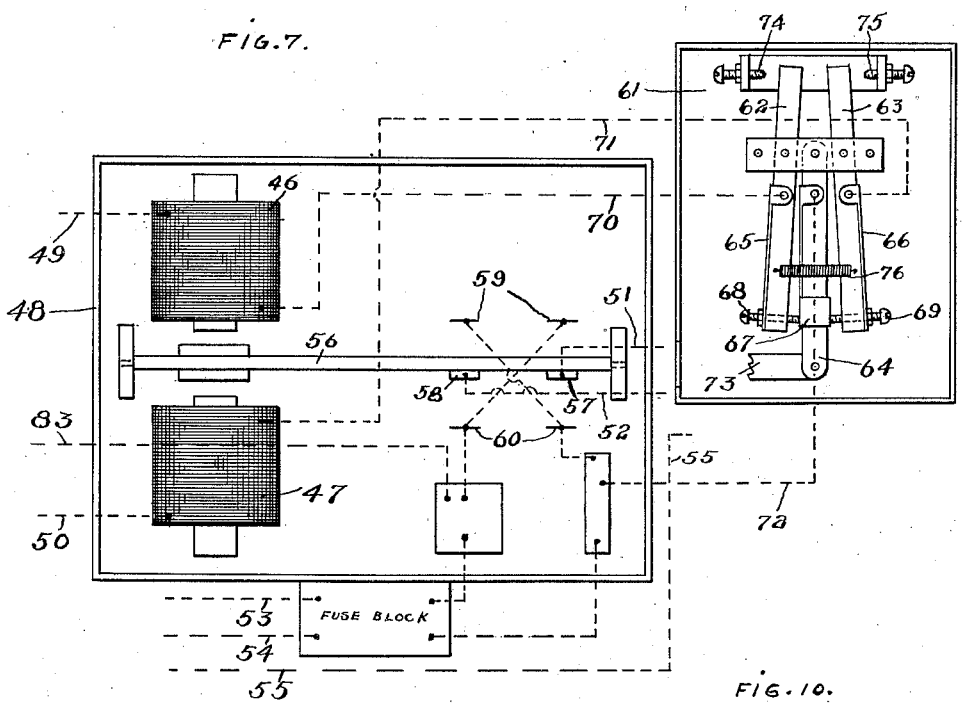
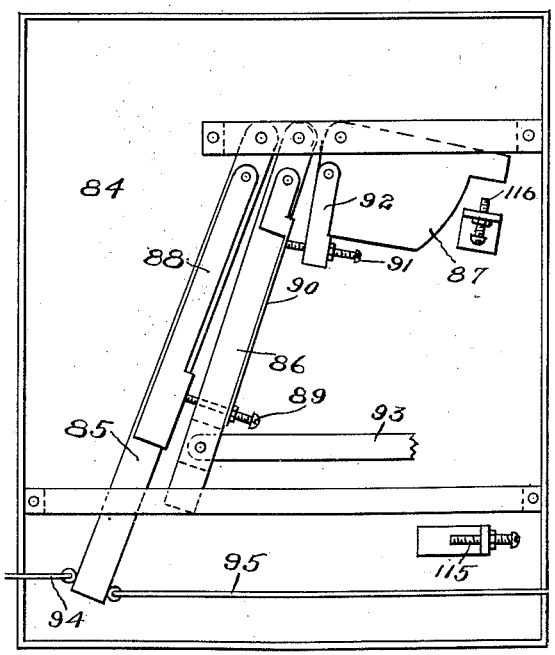
INVENTOR
DARCY E. LEWELLEN
BY
ATTORNEY Nov. 13, 1928.
D. E. LEWELLEN
1,691,294
AUTOMATIC SPEED CONTROLLING DEVICE
Filed Aug. 7, 1922    6 Sheets-Sheet 4
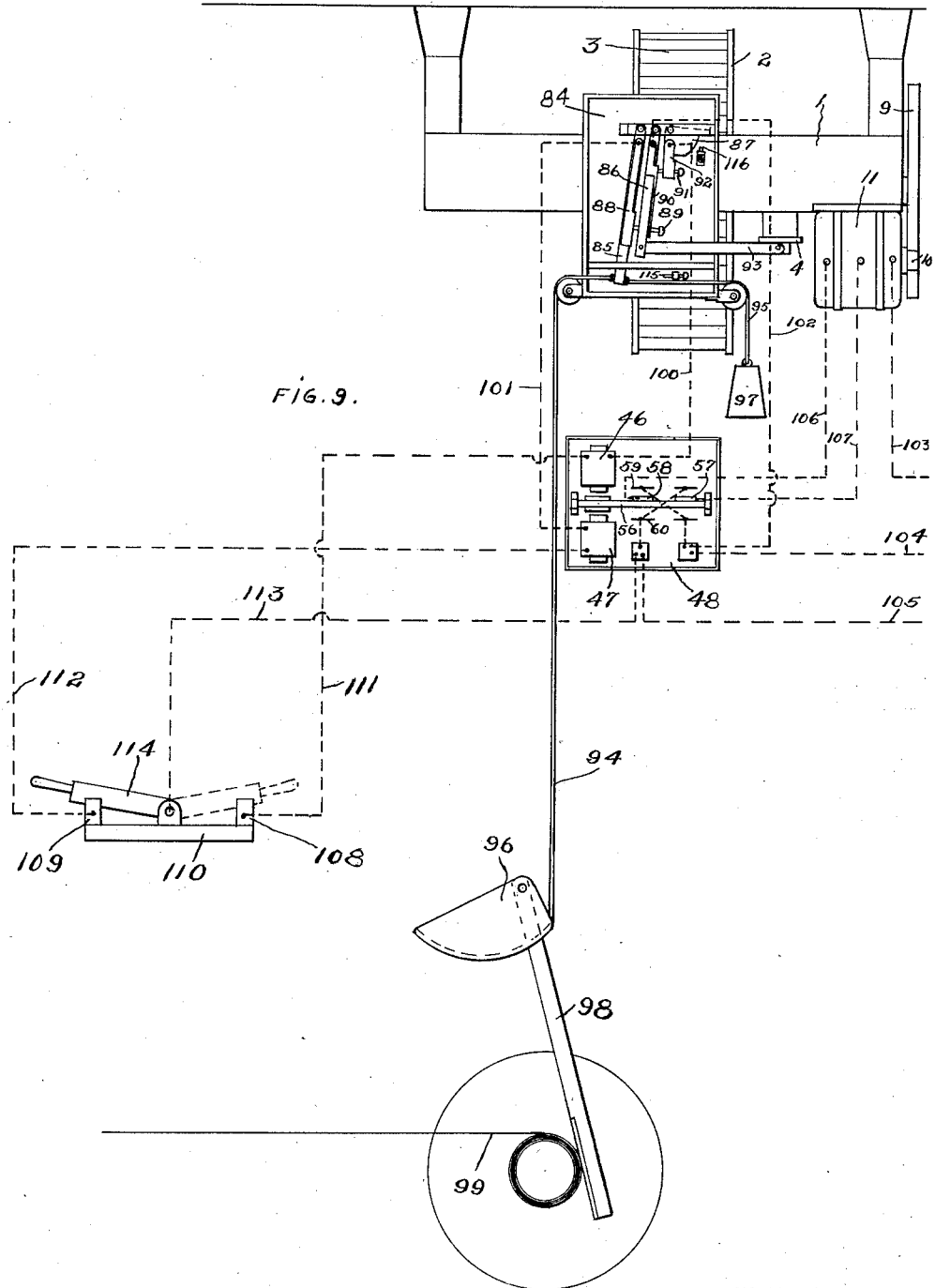
FIG.9.
INVENTOR
DARCY E. LEWELLEN
BY
ATTORNEY

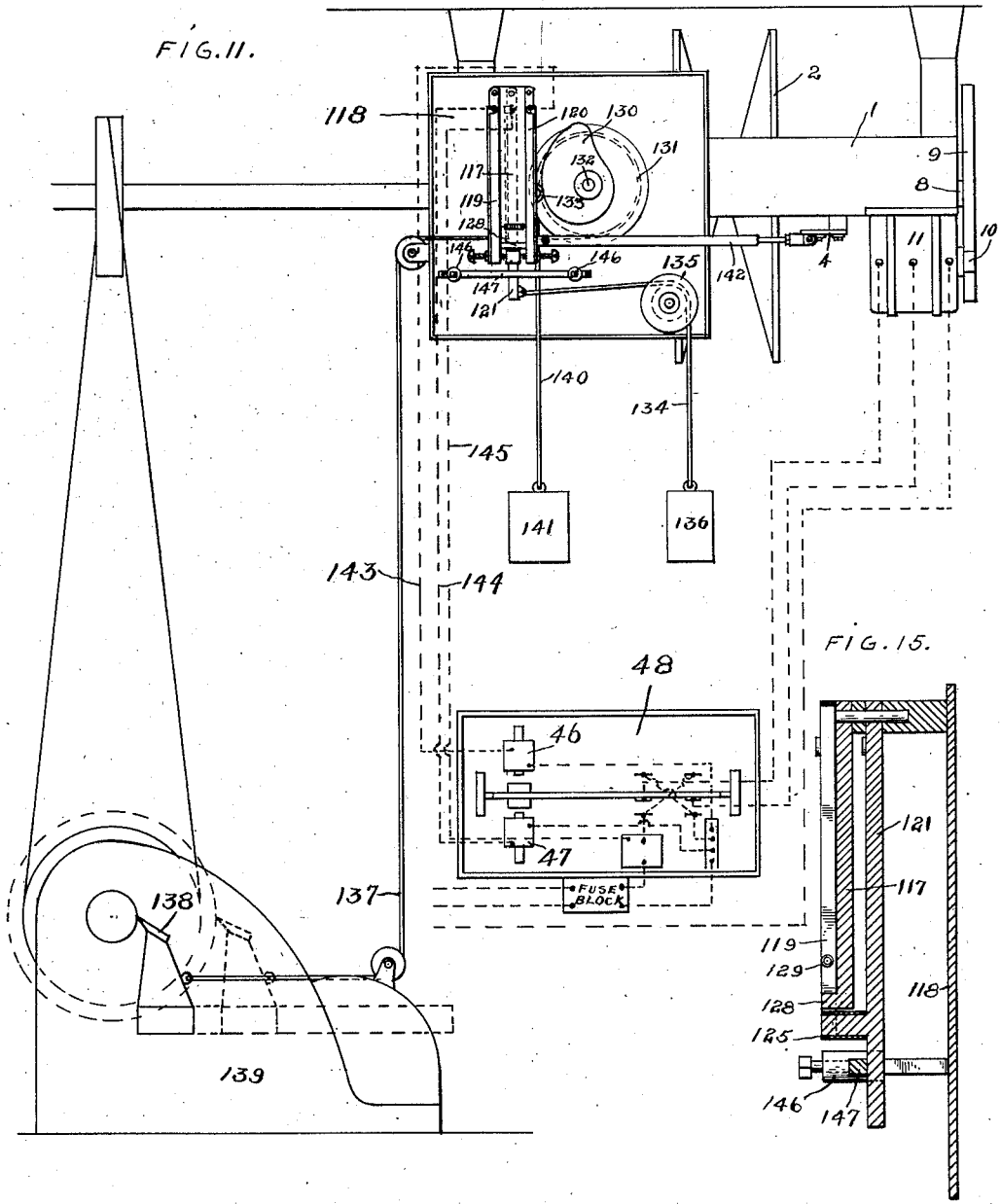

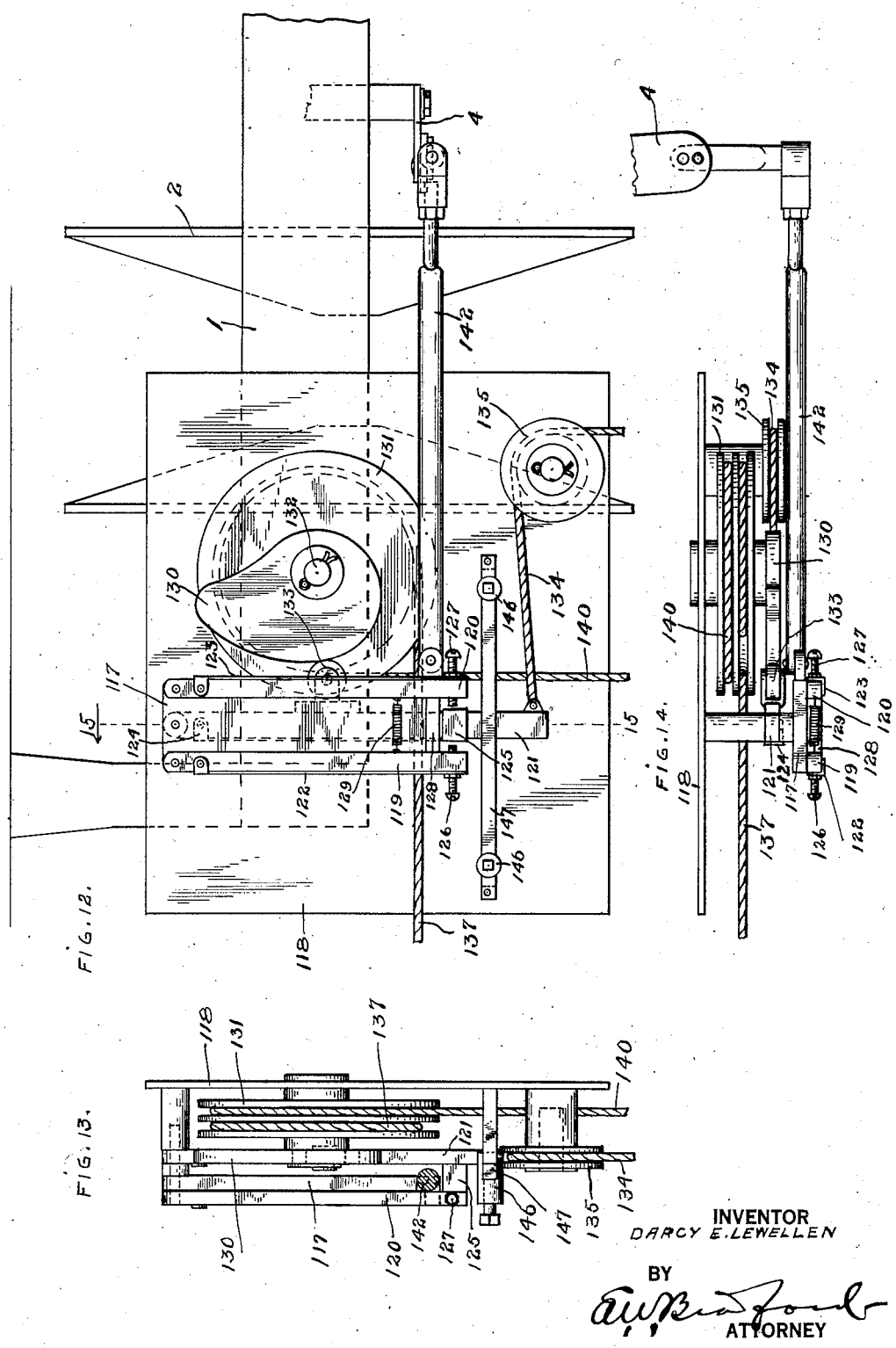

Patented Nov. 13, 1928.

1,691,294

UNITED STATES PATENT OFFICE.

DARCY E. LEWELLEN, OF COLUMBUS, INDIANA, ASSIGNOR TO LEWELLEN MANUFACTURING COMPANY, OF COLUMBUS, INDIANA, A CORPORATION OF INDIANA.

AUTOMATIC SPEED-CONTROLLING DEVICE.

Application filed August 7, 1922. Serial No. 580,312.

This invention relates to automatic speed controlling devices and is designed primarily for use in connection with variable speed transmissions for automatically controlling the speed thereof. One feature of the invention is the provision of means for controlling the variable speed transmission mechanisms when united in a battery whereby the parts being operated or driven may be operated in uniformity by causing one transmission mechanism of the battery to travel at a different speed from the other transmission mechanisms of the battery.

A further feature of the invention is the provision of means for controlling the speed of the transmission mechanism in conformity to the change in diameter of the object being operated upon.

A further feature of the invention is the provision of means whereby a change in position of parts of the transmission mechanism will act to automatically stop operation of the controlling device.

A further feature of the invention is the provision of means for automatically stopping the operation of the controlling device when the adjustment of the transmission mechanism has reached a prescribed point.

A further feature of the invention is the provision of means for reversing the operation of the controlling device under certain usages.

A further feature of the invention is the provision of means for causing a prolonged contact of parts of the controlling device when necessary.

A further feature of the invention is the provision of means for automatically cutting out the controlling device in the event of severance of the object being operated upon.

A further feature of the invention is the provision of means in connection with the automatic feature of the controlling device for manually operating the various transmission mechanisms for positioning them for harmonious co-operation when applied to use.

And a further feature of the invention is the provision of means for causing a greater degree of movement of parts of the controlling device at one time than another.

Other objects and advantages will be hereinafter more fully set forth and pointed out in the accompanying specification.

In the accompanying drawings which are made a part of this application,

Figure 1 is an elevation of a variable speed transmission mechanism showing the same employed for operating a cloth treating mechanism with the speed controlling device attached thereto, Figure 2 is an enlarged front elevation of the transmission mechanism showing the automatically operated controlling levers, Figure 3 is a fragmentary elevation of the transmission mechanism showing the automatic switch mechanism for controlling the operation of the speed controlling device, Figure 4 is an enlarged detail elevation of an automatic circuit making and breaking mechanism, Figure 5 is a sectional view thereof as seen on line 5—5, Figure 4, Figure 6 is a detail elevation of a breaking mechanism for co-operation with the circuit making and breaking device, Figure 7 is a top plan view of the switch mechanism shown in Figure 3 of the drawings and showing the controlling levers disclosed in Figure 2 of the drawings in elevation, Figure 8 is an end elevation of the mechanism shown in Figure 7, Figure 9 is an elevation of a different form of speed controlling device, Figure 10 is an enlarged elevation of controlling levers employed in connection with the device shown in Figure 9, Figure 11 is an elevation of an automatic speed controlling mechanism to be used in connection with a veneer cutting machine, the cutting device being shown in miniature, Figure 12 is an enlarged detail elevation of the mechanism shown in Figure 11, Figure 13 is an edge elevation thereof, Figure 14 is a top plan view thereof, and Figure 15 is a sectional view as seen on line 15—15, Figure 12.

Referring to the drawings, in which similar reference numerals designate corresponding parts throughout the several views, 1 indicates a variable speed transmission mechanism of that type employing pairs of disks 2, around which is extended a driving belt 3 and having levers 4 for moving said pairs of disks for changing the speed of travel of the driving shaft to which the variable speed transmission mechanism is attached.

In manufacturing numerous articles, said articles are subjected successively to various treatments and a plurality of batteries of the variable speed transmission mechanisms are used, and as the article being treated at one point travels at a speed greater or less than the travel of the article at another point, it is necessary to provide means for controlling the speed of the various transmission mechanisms as the various changes occur in the article being treated.

As a matter of illustration:

Variable speed transmission mechanisms, as disclosed in Figure 1 of the drawings, are employed for operating a cloth or fabric machine. In this form of device the fabric treating is passed over series of rollers 5, said rollers being so arranged that the fabric 6 will be immersed or carried through a solution within a vat 7, and as there are a number of vats and each succeeding treatment different from the preceding one, the fabric is caused to lengthen or shorten depending upon the treatment to which it is being subjected, consequently the fabric passing through one vat will vary in length in a different manner from the portion of fabric passing through other vats. As there is a speed transmission mechanism associated with and driving the pulleys of each vat, the levers of the various transmission mechanisms must be at intervals shifted in accordance with the changing conditions of the fabric during the successive treatment thereof in order to maintain the speed of the various transmission mechanisms in cooperative relation with each other.

The shifting of the lever 4 is most successfully accomplished by providing a worm shaft 8, in co-operation with the lever 4, to one end of which shaft is attached a gear 9, and meshing with said gear 9 is a pinion 10 attached to the rotor of an electrically driven motor 11, consequently when the motor is driven in opposite directions the lever 4 will be shifted back and forth for controlling the transmission disks 2 and the belt 3 co-operating therewith for increasing or decreasing the speed of the driven shaft of the variable speed mechanism.

The transmission mechanism 1 is operated from a three-phase motor 12, wires 13, 14 and 15 connecting the motor with any suitable source of electric power.

In order to automatically control the speed of each succeeding transmission mechanism, an idling roll 16 is slidably mounted between standards 17, which standards have elongated slots 18 through which the shaft 19 of the idling roll extends and by extending the strip of fabric 6 below the idling roll any shortening or lengthening of the fabric will instantly raise or lower the idling roll. The movement of the idler roll 16 is employed for changing the speed of the transmission mechanism by mounting one end of a pitman 19ª on one end of the shaft 19 and connecting the opposite end thereof to a lever 20 (Figs. 1 and 4), the opposite end of said lever being pivotally mounted on a stub shaft 21 (Figs. 4 and 5) located within and supported by a housing 22. Also rotatably mounted on stub shaft 21 is a block 23 preferably of insulating material and to said block are pivotally connected the inner ends of contact forming bars 24 and 25, said bars being respectively above and below the stub shaft 21 and extending a distance beyond the edge of the block 23 and preferably at an angle to the longitudinal axis of the lever 20. The contact bars 24 and 25 at a point beyond the edge of the block 23 are connected together by means of a spring 26 which normally holds the contact bars in engagement with the shoulders 27 formed between the block 23 and a guide 28, consequently limiting the inward swinging movement of the contact bars while they will have free outward swinging movement.

The outer ends of the contact bars 24 and 25 are provided with contact screws 29 and 30 respectively, which are adjustable through the contact bars and are adapted to engage with contact plates 31 and 32 respectively, carried by the lever 20. By this construction, when the lever 20 is raised or lowered through the upward or downward movement of the idling roll 16, the contact screw 29 or 30 will be engaged and a circuit to the motor 11 closed, and as said motor is connected with the wires 13, 14 and 15 the forming of the contact through the movement of the lever 20 will energize the motor 11 and through the pinion 10 and gear 9 rotate the worm shaft 8 and shift the lever 4 for changing the speed of the disks 2. The contact bars 24 and 25 are connected together by a wire 33, the opposite terminus of the wire 33 engaging a gap 34 which is normally closed through a plate 35 carried by a switch lever 36, a spring 37 normally holding the plate 35 in engagement with an adjustable screw 38 carried by the gap 34.

The block 23 has at one end an extension 39 which is curved on its free edge and engages a curved surface 40 on one edge of a brake bar 41, the bar 41 being held in engagement with the curved end of the extension through the medium of a spring 42, the friction set up between these parts normally holding the block 23 in its various shifted positions, but the pressure of the brake bar against the extension is not such as to materially retard the pivotal operation of the block when the lever 20 is moved into engagement with either of the screws 29 or 30.

The lever 20 is spaced from the block 23 by means of a separating plate 23ª, hence the swinging movement of the lever does not influence the block until the contact screws are engaged by the lever 20.

The swinging movement of the block 23 is regulated by adjusting screws 43 and 44 which are threaded through the terminals of a bracket 45 mounted interiorly of the housing 22. Said stops, however, do not affect the swinging movement of the lever 20 or the bars 24 or 25, as the spring 26 will yield to permit additional swinging movement of either of the members 24 or 25 after the block is in engagement with one or the other of the adjusting screws 43 or 44.

Plates 31 and 32 are connected with the magnets 46 and 47 respectively, of an automatic switch 48 through wires 49 and 50 respectively, and the automatic switch is connected with the three-phase motor 11 through wires 51 and 52 and the magnets are in turn connected to the power wires 13, 14 and 15, as is also the motor 11 through wires 53, 54 and 55. The automatic switch 48 is provided with a swinging bar 56 to which are attached contact tongues 57 and 58, said contact tongues being adapted for engagement with the contacts 59 or 60, dependent upon which of the plates 31 or 32 is in engagement with either of the contact screws 29 or 30 for completing a circuit through the wires connected therewith. The contacts 59 are so arranged that the motor 11 will be driven in one direction when the contact tongues 57 and 58 are engaged therewith and in the opposite direction when said contact tongues are in engagement with the contacts 60, and these connections are controlled through the magnets 46 and 47.

Associated with the automatic switch 48 is an automatic control 61 (Figures 2 and 3) comprising pivoted bars 62, 63 and 64, said bars having contact plates 65, 66 and 67 respectively, mounted thereon, the bars 62 and 63 having adjusting screws 68 and 69 respectively, which are adapted to contact with the plate 67 for forming a circuit through the wires 70, 71 and 72 respectively. The pivot bar 64 is connected at its lower end to the shifting mechanism for the variable speed disks 2 through the medium of a link 73, and as the disks are shifted back and forth to regulate the speed of the parts driven thereby the bar 64 is likewise swung on its pivot. As the bars 62 and 63 are in contact with the bar 64 through the screws 68 and 69, said bars 62 and 63 will be likewise swung on their pivots. The object of providing the bars 62, 63 and 64 is to automatically cut out the current to the motor 11 in the event the disks have reached their limit of movement in either direction, and to accomplish this result the bars 62 and 63 are elongated above their pivot points and these extended ends are positioned to engage with adjustable stops 74 and 75 respectively, and when said ends contact with one or the other of the stops the particular contacting bar will remain stationary and the other bars move away from the same, consequently breaking the circuit to the motor 11 through the wires connecting the bar 64 and the contacting bar which will prevent further shifting of the disks in that particular direction, but the circuit through the other outside bar and the bar 64 to the motor will not be affected, consequently the motor can always reverse and shift the disks in the opposite direction, this movement eventually freeing the contacting bar from its stop. The bars 62 and 63 are held in contact with the central bar 64 by means of a spring 76 which spans the bar 64 and has its ends connected with the bars 62 and 63, consequently both of the screws 68 and 69 will be held in engagement with the plate 67 until such time as they are disengaged therefrom by the bars 62 or 63 coming in contact with one or the other of the stops 74 or 75. The bars 62, 63 and 64 are so pivoted with respect to each other that the screws 68 and 69 will have sliding action against the plate 67 when said bars are swung back and forth, consequently a constant contact surface will be maintained between the ends of the screws and the plate 67.

When the cloth feeding operation is first begun it is necessary to manually regulate the various variable speed mechanisms to obtain the proper speed thereof, and to this end a switch 77 (Fig. 4) is provided which comprises a plate 78 and a pair of contacts 79 and 80 which are normally out of contact with the plate 78, push buttons 81 and 82 being provided for receiving pressure of the thumb or finger for forcing the contacts into engagement with the plate to complete the circuit, the plate 78 being connected to a wire 83, in this instance extending from the plate 35 to parts of the automatic switch 48, while the contacts 79 and 80 are connected respectively with the wires 49 and 50.

With this form of device, after the strip of cloth has been properly introduced through the various sets of rollers and beneath the idling rolls, the speed of the various speed mechanisms is regulated through the manipulation of their respective hand operated switches 77 until all of the variable speed mechanisms are operating in conjunction with each other. In the event that one of the idling rolls 16 should be moved upwardly through the shortening of the strip of fabric 6, the lever 20 will be swung on its supporting shaft 21 and the plate 31, through the continued movement of the roll 16, brought into contact with the screw 29 thereby closing the circuit through the wires 33 and 83 and the wire 49 energizing the magnet 46 and swinging the bar 56 laterally until the tongues 57 and 58 engage with the contacts 59, thus energizing the motor 11 and causing the worm shaft 8 to operate to shift disks 2, the shifting operation continuing so long as the contact screw 29 is in engagement with the plate 31.

Under oridnary running conditions the lever 20 plays back and forth between the contact screws 29 and 30 and the idler roll 16 is retained substantially at its center of vertical movement, hence the position of the block 23 is not materially changed and the breaks between the contact screws 29 and 30 and the contact plates 31 and 32 are almost instantaneous. This is due to the adjustment of the parts of the transmission mechanism in accordance with the slight change in position of the roll 16.

In the event of an excess movement of the roll 16 and lever 20 such as to move the block 23 sufficiently to bring the extension 39 into engagement with either of the adjusting screws 43 or 44, the lever 20 may continue its swinging movement even though the movement of the block is stopped as the spring 26 will yield and permit either of the bars 24 or 25 to swing away from their respective shoulders 27. This provides for a prolonged contact between the contact screws 29 or 30 and the plates 31 or 32 as the contact will continue until the lever 20 reverses its movement sufficiently to allow the lever carrying the contacting screw to again engage with its respective shoulder 27 when the circuit will be broken.

This continued or prolonged contact gives an excess adjustment to the disks 2 which is very essential in the event the idler roll 16 has reached a point adjacent its limit of movement in either direction, or when two or more of the speed mechanisms encounter a change of speed simultaneously, the object being to maintain the idling roll as near its center of travel as possible. This action is not brought into use however, except when a contact is made at a time when the idler 16 is near its limit of movement.

In the event the strip of fabric should become severed the idling roll will descend to the bottom of the slot in the standard 17, thus causing the lever 20 to strike the free end of the switch lever 36 and break the circuit between the plate 35 and wire 33 thereby automatically stopping the operation of the shifting mechanism of that particular variable speed mechanism.

In Figures 9 and 10 of the drawings a device is shown for regulating the speed of a variable speed transmission mechanism employed for driving a machine element used for winding strips of fabric or paper into a roll, the object being to gradually decrease the speed of the transmission mechanism as the size of the roll increases.

In this form of device the circuit forming mechanism shown in Figure 4 of the drawings is dispensed with and a switch mechanism 84 is provided comprising a pair of swinging arms 85 and 86 and a swinging latch 87, the swinging arm 85 having a contact plate 88 with which is adapted to contact an adjustable screw 89 carried by the arm 86, said arm 86 having a contact plate 90 for engagement with an adjustable screw 91 carried by a contact plate 92 on the latch 87. The arm 86 is connected with the shifting mechanism of the transmission through a link 93 while the arm 85 has cables 94 and 95 connected thereto and extending from opposite sides thereof, the cable 94 being connected with a cam 96 while the cable 95 is connected with a weight 97. The weight 97 normally holds the arm 85 in engagement with the screw 89, while the screw 91 is normally held in engagement with the contact plate 90 by gravity.

Connected with the cam 96 is a lever 98 which is adapted to travel over the surface of the article 99 as it is being wound into a roll, the lever and cam being so constructed and positioned that they will counteract the pulling action of the weight 97 and hold the same stationary until such time as the diameter of the roll is increased and the cable 94 slackened.

The cam 96 is preferably so constructed that at the beginning of the winding operation, the swinging movement of the lever 98 will impart a limited slackening movement to the cable 94, the amount of slack created by the swinging movement of the lever gradually increasing as the lever is elevated by the increased size of the roll. The same form of automatic switch 48 is used with this device, the magnet 46 being wired to the plate 92 carried by the swinging latch 87 through a wire 100, while the plate 88 is connected with the magnet 47 through the wire 101. The plate 90 is connected with the switch mechanism 48 through a wire 102 and the switch mechanism 48 with the main line wires 13, 14 and 15 through wires 103, 104 and 105, the wire 103 connecting with the motor 11. Wires 106 and 107 are also connected with the motor 11 and extend to the contact tongues 58 and 57 of the switch mechanism 48.

The magnets 46 and 47 are in this instance connected to the terminals 108 and 109 of a two-way switch 110 through wires 111 and 112 respectively, while a third wire 113 extends from the switch mechanism 48 to a switch tongue 114. The switch mechanism 110 is operated manually and so constructed that when the tongue 114 is in engagement with one set of the terminals the swinging arms and the swinging latch of the switch mechanism 84 will be caused to move in one direction and when the switch tongue is in engagement with the opposite terminals these parts will be caused to move in the opposite direction. The swinging arms 85 and 86 and the latch 87 are so pivoted that the screws 89 and 91 will have frictional engagement with the plates 88 and 90 respectively, and will move back and forth over the surface of the said plates as the arms to which they are connected are swung back and forth.

With this form of device the movement of the parts of the transmission mechanism employed for regulating the speed thereof is also employed for breaking the circuit between the plates 88 and 89, consequently breaking the circuit through the wires 101 and 102 and causing the operation of the motor 11 to stop. The lateral swinging movement of the arm 85 is limited by a stop 115, while the downward swinging movement of the latch 87 is limited by a stop 116.

The operation of this form of device is as follows:

As the size of the roll increases the lever 98 is swung upwardly thereby permitting the cable 94 to slacken and at the same time the weight 97 will move downwardly to the extent of the slack in the cable 94, this movement continuing until the plate 88 is moved against the end of the screw 89. This forms a circuit through the wires 101 and 102 and sets up operation of the motor 11 which shifts the position of the disks 2, and this operation will continue until the slack is entirely taken up in the cable 94, or so long as the screw 89 is in engagement with the plate 88. The operation of the motor 11 when energized will continue until the arm 86 is swung away from the arm 85 thereby breaking the circuit through the screw 89 and plate 88 and stopping the operation of the motor 11. These parts will remain idle until such time as the cable 94 again becomes slack, whereupon the same operation will be repeated.

In this form of mechanism the parts are shifted in one direction only for intermittently energizing the motor 11, for when the arm 85 has swung its prescribed distance to the right it will come in contact with the stop 115 and, incident to the motor disengaging the screw 89 from the plate 88, the motor will be de-energized and remain so until such time as the parts of the switch mechanism 84 are reset for another winding operation.

During the winding operation the switch tongue 114 is in engagement with the terminals 109 of the two-way switch 110 thereby closing the circuit through the wires 112 and 113 as well as through the magnet 47 and arms 85 and 86, and this circuit will be maintained intermittently until the winding operation is completed.

In resetting the parts of the controlling switch 84 the tongue 114 is swung over into engagement with the terminals 108, as indicated by dotted lines in Figure 9 of the drawings, this operation closing the circuit through the wires 111 and 113 and energizing the magnet 46, the circuit continuing through the wire 100, plate 92, screw 91, plate 90 and wire 102. The closing of the switch in this instance will reverse the motor 11 and through the link 93, which is connected to the shifting lever 4 of the transmission mechanism, will move the arm 86 to the left and will likewise swing the arm 85 to the left and again elevate the weight 97, the lever 98 and cam 96, at the same time returning them to their initial position, as when the winding operation is starting.

The movement of the levers 85 and 86 to the left will continue until the swinging action of the latch 87 is checked by the stop 116 which will result in breaking connection between the screw 91 and the plate 90 and cutting out the circuit to the motor 11. After the tongue 114 has been again swung into engagement with the terminals 109 the parts of the device are again ready for the winding operation, and as the article is wound into a roll the lever 98 will be again elevated and the intermittent adjusting operation of the disks of the variable speed mechanism repeated.

The form of device shown in Figures 11 to 15 inclusive, is adapted preferably for use with veneer cutting machines so that as the diameter of the log being cut decreases the speed of the transmission mechanism will be regulated accordingly. In this form of device a frame 117 is pivotally mounted within a housing 118 and to the front face of said frame are pivoted arms 119 and 120, while to the rear of said frame is pivotally mounted an arm 121. The arms 119 and 120 are provided with contact plates 122 and 123 respectively, while the arm 121 is provided with a contact plate 124, said plate 124 having an extension 125 which projects beneath the frame 117 and between the lower free ends of the arms 119 and 120. The arms 119 and 120 have screws 126 and 127 respectively, which are adjustable and adapted to be moved into contact with the extension 125 for forming an electric circuit. The lower end of the frame 117 is provided with a spacing block 128 which projects between the arms 119 and 120 and limits the inward swinging movement of said arms, the arms being held normally in engagement with the ends of the block by means of a spring 129. The arm 121 is swung in one direction, or to the left, through the medium of a cam 130 which is fixed to a sheave 131, which in turn is mounted upon a shaft 132, the face of the cam 130 traveling against the trunnion 133 carried by the arm 121, and when the cam is rotated in one direction it will swing the arm 121 to the left and form a contact between the plate 125 and the screw 126. The arm 121 is moved in the opposite direction and the trunnion 133 normally held in engagement with the face of the cam 130 by attaching a cable 134 to the lower end of the arm 121 and extending the same over a sheave 135, the opposite end of the cable having a weight 136 attached thereto. The cam 130 and the sheave 131 to which it is attached, are rotated in one direction by means of a cable 137, one end of which is attached to the sheave 131 and the opposite end thereof to the cutting head 138 of a veneer machine 139, the movement of the cutting head of the veneer machine in one direction determining the position of the cam 130 with respect to the trunnion 133. A cable 140 is attached at one end to the sheave 131 while its opposite end has a weight 141 attached thereto which is heavier than the weight 136, consequently, when the cutter head 138 is moved outwardly to its initial cutting position, a slack will be formed in the cable 137, and the weight 141 will rotate the sheave 131, and the cam 130 attached thereto, in such manner as to swing the arm 121 laterally and form a contact between the parts 125 and 126 and thus setting up operation of the motor 11 for correcting the speed of the transmission mechanism in accordance with the changed position of the cutter head.

Pivotally connected to one edge of the frame 117 is a pitman 142 the opposite end of said pitman being pivotally connected to the shifting lever 4 of the transmission mechanism, consequently when the motor 11 is energized the shifting of the disks 2 will result in so moving the frame 117 as to disengage the member 125 from one or the other of the screws 126 or 127 thereby breaking the circuit to the motor and stopping further operation thereof.

In this construction the switch mechanism 48 is also employed and the magnets 46 and 47 are connected respectively to the arms 120 and 119 through wires 143 and 144, while the arm 121 is electrically connected with the switch mechanism 48 through the medium of a wire 145. The swinging movement of the arm 121 is limited in either direction by stops 146, said stops being adjustably connected with a guide bar 147 so that the degree of swinging movement of the arm 121 may be increased or decreased. In converting a log into veneer, cutter head 138 is first positioned as shown by dotted lines in Figure 11, the movement of the cutter head 138 into position to engage with the peripheral surface of the log being cut forming a slack in the cable 137 thereby permitting rotation of the sheave 131 and the cam mounted thereon, the weight 141 rotating the sheave and cam and thereby directing pressure against the trunnion 133 and swinging the arm 121 to the left and into engagement with the screw 126. This forms a circuit through the parts 122 and 124 and through the wires 144 and 145, energizing the magnet 47 and setting up operation of the motor 11. After the speed of the disks 2 has been properly regulated the circuit will be broken between the plate 125 and the screw 126 thereby stopping further operation of the motor until the diameter of the log has been decreased and the cutter head 138 moved further towards the log. This action shifts the cam away from the trunnion 133 and raises weight 141, whereupon the weight 136 will swing the arm 121 into engagement with the screw 127 thereby forming a circuit through the wires 145 and 143 and energizing the magnet 46. This operation will move the parts of the mechanism 48 for closing the circuit through the motor 11 in such manner as to reverse the rotation of the motor and cause the disks 2 to be shifted in the opposite direction, the operation of the parts being continued until the log has been reduced in its entirety to veneer.

In this construction the speed regulating device operates entirely automatically, the direction of rotation of the motor 11 depending entirely upon the direction of movement of the cutter head 138.

The provision of the various cams, as shown, is essential as a given movement of parts of the variable speed mechanism at one point gives a far greater amount of change in speed than will result from the same given movement at another point, consequently by properly shaping the cams this change of movement will be compensated for.

Having thus fully described my said invention, what I claim as new and desire to secure by Letters Patent, is:

1. The combination with a variable speed transmission mechanism and a processing machine operated thereby, of an electrically operated motor for changing and controlling the speed transmission mechanism, means controlled by changing conditions of the element being processed for energizing said motor, selective mechanism for determining the rotation of said motor, and automatically operated means for de-energizing said motor when the variable speed mechanism has reached its limit of adjustment.

2. The combination with a variable speed transmission mechanism and a machine operated thereby, said machine having a movable part, of a motor for changing the speed of said transmission mechanism, an electric circuit connected with said motor, a contact forming mechanism in said circuit operable normally by the movable portion of the machine to close said circuit for relatively brief periods, and means for obtaining a prolonged contact, between parts of the contact forming mechanism under abnormal conditions in said machine.

3. In an automatic speed controlling device the combination with a variable speed transmission mechanism, and a machine operated by said transmission mechanism, of an electric motor for changing the speed of said transmission mechanism, a contact forming mechanism, an electric circuit connecting said motor and contact forming mechanism, means for operating said contact forming device by the condition of parts of said machine, and means for causing a prolonged contact between parts of said contact forming device on abnormal changes in such condition.

4. In an automatic speed controlling device, the combination with a variable speed transmission mechanism including frictionally-engaged driving and driven elements, of a driven machine having a movable part, an electric motor for adjusting one of said frictionally-engaged elements relatively to the other, a contact forming mechanism operable from the movable part of said machine, an electric circuit connecting said motor and contact forming mechanism, a gap formed in said circuit, and means for opening said gap and breaking the circuit to said motor incident to an excess movement of the movable part of the machine in one direction.

5. In an automatic speed controlling device, an electrically driven motor, electrically operated means for energizing and controlling said motor, pivoted bars associated with the electrically operated means, contact plates carried by said bars, contact screws associated with said bars, and means for causing said screws to drag over said contact surfaces when said bars are swung laterally.

6. The combination with a variable speed transmission mechanism and a machine driven thereby, said machine having a movable part, of a speed changing mechanism, means actuated by said movable part for operating the speed changing mechanism, means for reversing the direction of movement of said speed changing mechanism at any point in the travel of the movable part, and adjustable means for regulating the movement of the reversing means, substantially as set forth.

7. The combination of a variable speed transmission mechanism and a machine driven thereby, adjusting means for the transmission mechanism, means for progressively varying the speed of the machine including a movable element controlled by the material in the machine and connections between said element and said adjusting means whereby a change of position of said element while near the middle of its range of movement operates the adjusting means, and a like change of position while near the limit of said range causes a prolonged operation of said adjusting means, substantially as set forth.

8. The combination of a variable speed transmission mechanism and a machine driven thereby, adjusting means for the transmission mechanism, and automatically controlled means connected to the adjusting means adapted to correct minor speed deviations from normal speed by a minor actuation of the speed varying means and major deviations by a disproportionately prolonged actuation thereof, substantially as set forth.

9. In an automatic speed controlling mechanism, a contact forming device comprising a pair of pivoted bars, a lever, coacting contacts on said bars and lever arranged to make relatively brief engagement on ordinary movements of the lever, and means whereby such engagement is prolonged to a disprotionate extent on movement of the lever beyond predetermined limits, substantially as set forth.

10. In an automatic speed controlling mechanism, a contact forming device comprising a pair of movable contacts, contacts movable relatively thereto arranged to make relatively brief engagement with the first-named contacts during ordinary movements, and means whereby such engagement is prolonged to a disproportionate extent on abnormal movement of the last-named contact, substantially as set forth.

11. The combination of a machine having a change-speed mechanism, a work-controlled element, adjusting means for a part of the change-speed mechanism including electric circuits, a plurality of contacts in said circuits, contacts movable to make relatively brief engagement selectively with said first-named contacts under control of said work-controlled element, and means for prolonging said engagement disproportionately upon abnormal movement of said work-controlled element, substantially as set forth.

12. In an automatic speed controlling device, a pivoted support, stops to limit pivotal movement thereof, bars pivotally mounted on the support, a lever pivoted adjacent to the pivot of said support between said bars, lost-motion connections between the lever and said bars, and lost-motion connections between said bars and said support, substantially as set forth.

13. In an automatic speed controlling device, a movable support, stops to limit movement thereof, bars mounted on the support, a work-controlled element having lost-motion connection to said bars, and lost-motion connections between said bars and said support, substantially as set forth.

14. In an automatic speed controlling device, a movable support, stops to limit movement thereof, bars mounted on the support, a work-controlled element movably mounted on said support said element having lost-motion connection to said bars, and lost-motion connections between said bars and said support, substantially as set forth.

15. In an automatic speed controlling device, a movable element, a plurality of contacts loosely supported thereon, a second movable element, a plurality of contacts thereon coacting with those on the first-named element to close circuits selectively, and connections whereby actuation of the second-named movable element first closes a circuit, and continued movement beyond a predetermined limit moves the first movable element, substantially as set forth.

16. In an automatic speed controlling device, a pivoted block, a pivoted lever, coacting contacts on the block and the lever the contacts on one of said members being pivotally supported, and connections whereby limited movement of one of said members closes a circuit without moving the other while movement beyond a predetermined limit also moves the other member, substantially as set forth.

17. In an automatic speed controlling device, a contact forming device comprising a movable block, means for limiting the movement of said block, a pair of bars pivoted to said block, connections between said bars and said block, a lever associated with said bars, coacting contacts on the lever and the respective bars arranged to close selectively a pair of circuits on short movement of the lever and to keep the selected circuit closed for disproportionately long periods on longer movements of said lever, substantially as set forth.

18. The combination with a variable speed transmission mechanism having movable discs and electrically controlled means for moving said discs, including electric circuits, of means forming a series of cooperating circuit-breaking elements in said electric circuits, and means for breaking one of said circuits without affecting another one of said circuits, whereby the movement of the discs in one direction will be stopped, substantially as set forth.

19. In combination, a variable speed mechanism, a machine having a part driven by the variable speed mechanism, a motor for acting on said variable speed mechanism to change the speed of said driven part, work-controlled means for starting and stopping the motor, and means to stop the action of the motor when the variable speed mechanism reaches either its high or low speed limit, substantially as set forth.

20. In combination, a plurality of variable speed mechanisms, an apparatus having a plurality of units each driven by one of said mechanisms, work-operated means for varying the speed of each unit through said variable speed mechanisms, and manual means for operating each of said variable speed mechanisms independently of the rest, substantially as set forth.

21. The combination of a variable speed transmission for a machine, a speed control device for the transmission, a switch closed by some variation in the condition of the machine, a motor in circuit with the switch, connections from the motor to vary the setting of the transmission, a train of connections from the transmission to the switch serving to open it after sufficient speed variation has been introduced, and a compensating cam forming part of said train of connections said cam being shaped to permit the said sufficient speed variation to be uniform even though the motor operates to vary the setting of the transmission in a non-uniform manner, substantially as set forth.

22. In combination, a variable speed transmission mechanism, a speed changing mechanism on said variable speed transmission mechanism, a motor for operating said speed changing mechanism, work-controlled means for starting the motor and limit switches operated by a movable part of the transmission mechanism for controlling the operation of said motor, substantially as set forth.

23. In combination, a variable speed transmission mechanism, a speed changing means on said variable speed transmission mechanism including a motor for operating said speed changing means work-controlled means for closing the switch, a switch for closing the motor circuit, limit switches for stopping the motor, and means for operating the limit switches said means comprising a part of the speed changing means moving toward operative relation with the limit switches during a speed changing operation, substantially as set forth.

24. The combination of a variable speed transmission mechanism having a belt and oppositely tapered members coacting with the belt, a machine driven from said transmission mechanism, a speed controlling device, and means for automatically imparting irregular relative movements to said variable speed mechanism to provide a regular change of speeds to said machine, substantially as set forth.

25. The combination of a variable speed transmission mechanism having a belt and oppositely tapered members coacting therewith, a machine driven thereby, said machine having a movable work-controlled part, a speed controlling device with means for imparting irregular relative movements to said belt and said tapered members to provide a regular change of speeds to said machine, and connections from said movable part to said speed controlling drive for operating the same, substantially as set forth.

26. The combination of a variable speed mechanism and controlling means therefor including a movable support 23, a work-controlled element 20 having movement with and independently of said support, and means for operating the variable speed mechanism during a joint movement of said support and said work-controlled element following an independent movement thereof, substantially as set forth.

27. The combination of a variable speed mechanism and controlling means therefor including a movable support, a work-controlled element having movement with and independently of said support, and means for operating the variable speed mechanism during an independent movement of said work-controlled element following a joint movement of said support and said work-controlled element, substantially as set forth.

28. The combination of a variable speed mechanism and controlling means therefor including a movable support, a work-controlled element having movement with and independently of said support, means for operating the variable speed mechanism during a joint movement of said support and said work-controlled element following an independent movement thereof, and during an independent movement of said work-controlled element following such joint movement, substantially as set forth.

29. The combination with a machine and a variable speed transmission mechanism for driving said machine, of a motor for changing and controlling the speed of said transmission mechanism, manually operated means for energizing said motor and determining the direction of rotation thereof, and automatically operated means controlled by parts of the machine for intermittently operating said motor, substantially as set forth.

In witness whereof, I have hereunto set my hand at Indianapolis, Indiana, this 4th day of August, A. D. nineteen hundred and twenty-two.

DARCY E. LEWELLEN.